US012780957B2

(12) United States Patent
Igoe et al.

(10) Patent No.: US 12,780,957 B2
(45) Date of Patent: Nov. 3, 2026

(54) PROCESS FOR REMOVING CHLORINE FROM A PLASTIC MIXTURE

(71) Applicant: Anellotech, Inc., Pearl River, NY (US)

(72) Inventors: William Igoe, Pearl River, NY (US); Torren Carlson, Pearl River, NY (US); Leslaw Mleczko, Dormagen (DE)

(73) Assignee: Anellotech, Inc., Pearl River, NY (US)

( * ) Notice: Subject to any disclaimer, the term of this patent is extended or adjusted under 35 U.S.C. 154(b) by 451 days.

(21) Appl. No.: 18/236,354

(22) Filed: Aug. 21, 2023

(65) Prior Publication Data

US 2024/0059805 A1 Feb. 22, 2024

Related U.S. Application Data

(60) Provisional application No. 63/399,686, filed on Aug. 21, 2022.

(51) Int. Cl.

*C08F 6/28* (2006.01)
*C08G 85/00* (2006.01)
*C08J 11/12* (2006.01)
*C08J 11/14* (2006.01)
*C08J 11/16* (2006.01)

(52) U.S. Cl.

CPC .............. *C08F 6/28* (2013.01); *C08G 85/002* (2013.01); *C08J 11/12* (2013.01); *C08J 11/14* (2013.01); *C08J 11/16* (2013.01); *C08J 2300/16* (2013.01); *C08J 2300/30* (2013.01); *C08J 2327/00* (2013.01); *C08J 2427/00* (2013.01)

(58) Field of Classification Search

CPC . C08F 6/28; C08G 85/002; C08J 11/14; C08J 11/16; C08J 2300/16; C08J 2300/30; C08J 2327/00; C08J 2427/00; C08J 11/12
See application file for complete search history.

(56) References Cited

U.S. PATENT DOCUMENTS 5,821,395 A 10/1998 Price et al.
6,011,187 A 1/2000 Horizoe et al.
6,211,331 B1 * 4/2001 Craig ................ B01D 19/0005 425/207
7,758,729 B1 7/2010 DeWhitt
10,829,696 B2 11/2020 Javeed et al.

FOREIGN PATENT DOCUMENTS

JP H0967581 A * 3/1997
JP H09310077 A * 12/1997

OTHER PUBLICATIONS

International Preliminary Examination Report on Patentability from International Application No. PCT/US2023/072599 issued Feb. 25, 2025.
International Search Report from International Application No. PCT/US2023/072599 dated Nov. 28, 2023.
Shiraga et al "Boiling-Point Distributions and Dechlorination of Organic Chlorine Compounds in Oil Obtained from the Degradation of PVC Mixed Plastic," Energy & Fuels 1999, 13, 428-432.
Lopez-Urionabarrenechea et al. "Catalytic stepwise pyrolysis of packaging plastic waste." J. Anal. Appl. Pyrol. 96, (2012) 54-62.
Fukushima, et al, "Study on dechlorination technology for municipal waste plastics containing polyvinyl chloride and polyethylene terephthalate," J Mater Cycles Waste Manag (2010) 12:108-122.
Fukushima, et al, "Toward maximizing the recycling rate in a Sapporo waste plastics liquefaction plant", J Mater Cycles Waste Manag 11 (2009) pp. 11-18).

* cited by examiner

*Primary Examiner* — Rabon A Sergent
(74) *Attorney, Agent, or Firm* — Frank Rosenberg

(57) ABSTRACT

A process that removes chlorine or other halogens from plastic mixtures by passing a plastic mixture through an extruder, a mixer, and one or more devolatilization vessels.

29 Claims, 1 Drawing Sheet

PROCESS FOR REMOVING CHLORINE FROM A PLASTIC MIXTURE

RELATED APPLICATIONS

This application claims the benefit of U.S. Provisional Patent Application Ser. No. 63/399,686, filed 21 Aug. 2022.

FIELD OF THE INVENTION

This invention relates to the removal of chlorine and other halogens from a mixture of waste plastics, polymers, and other waste materials using a 3-step thermochemical process.

INTRODUCTION

In 2019, plastics generation in the United States was 55.2 million tons, which was 13 percent of MSW generation. World-wide over 368 million tons of plastics were produced. While the majority of plastic waste is landfilled via municipal solid waste programs, a significant portion of plastic waste is found in the environment as litter, which is unsightly and potentially harmful to ecosystems. Plastic waste is often washed into river systems and ultimately out to sea. By some estimates, of the 8.3 billion tons of plastics ever produced, 6.3 billion tons ended up as waste, of which only 9% has been recycled. Plastic recycling recovers scrap or waste plastic and reprocesses the material into useful products. However, since China banned the import of waste plastics in 2018 the recycle rate in the US is estimated to have dropped to only 4.4%.

The majority of recycled materials, including plastics, are mixed into a single stream which is collected and processed in a material recovery facility (MRF). At the MRF, materials are sorted, washed, and packaged for resale. Mechanical recycling, also known as secondary recycling, is the process of converting recycled plastic waste into a re-usable form for subsequent manufacturing. Waste plastic materials need further sorting into the various plastic resin types, e.g., low density polyethylene (LDPE), high density polyethylene (HDPE), polypropylene (PP), polystyrene (PS), polyvinyl chloride (PVC), polyvinylidene chloride (PVDC), and polyethylene-terephthalate (PET) for separate recycling treatments. Unfortunately, mechanical recycling is only applicable to small, homogeneous fractions of recycled polymers.

Chemical recycling by thermal processes, such as pyrolysis or catalytic pyrolysis, can convert waste plastics to gas and liquid building blocks to make new materials. The liquid products (e.g., pyrolysis oil) may contain paraffins, isoparaffins, olefins, naphthenes, and aromatic components along with organic chlorides in concentrations of hundreds to thousands of ppm where the waste plastics streams contain PVC and/or PVDC. Without costly sorting steps that remove most chlorine-containing materials (PVC and PVDC) before the pyrolysis unit, it is unlikely chlorine concentrations can be reduced to an acceptable level (<10 ppmw) with prior art processes. Any technology must be able to achieve about 99.999% chlorine removal to process even 2% PVC in the feed to avoid possible fouling and corrosion in the downstream processes.

Shiraga et al ("Boiling-Point Distributions and Dechlorination of Organic Chlorine Compounds in Oil Obtained from the Degradation of PVC Mixed Plastic," *Energy & Fuels* 1999, 13, 428-432) determined that the Cl content of pyrolysis oil components with 6-12 carbon atoms were as high as 0.6% by weight (6,000 ppm) in single step pyrolysis or catalytic pyrolysis experiments at 360-480° C. As a result, multi-step processes have been proposed wherein much of the chlorine is removed in a preliminary step and the resulting liquids are upgraded in further steps.

Lopez-Urionabarrenechea et al (Lopez-Urionabarrenechea, et al, 2012. "Catalytic stepwise pyrolysis of packaging plastic waste." *J. Anal. Appl. Pyrol.* 96, 54-62) describes a two-step process for pyrolysis of waste materials in which the combination of a first low temperature step without catalyst, and a second step after adding catalyst, was tested. They found it "was necessary to cool down the system with the plastic sample to room temperature after the dechlorination step, extract the dechlorinated melted sample, freeze it in liquid nitrogen, grind it in a mill, mix it with the catalyst and place them together again in the reactor, to carry out the catalytic second step." Nevertheless, the liquid products contained 0.3 wt % Cl.

A stepwise dechlorination process using a single screw extruder employed at a commercial plant by Sapporo Plastics Recycling Co., Ltd. was described by Fukushima et al in two publications (Fukushima, et al, "Study on dechlorination technology for municipal waste plastics containing polyvinyl chloride and polyethylene terephthalate," J Mater Cycles Waste Manag (2010) 12: 108-122; J Mater Cycles Waste Manag (2009) 11: 11-18). The extruder has heated sections for pressurization, metering, kneading, and discharge to produce a liquid mixture containing <0.5% Cl that can be fed to a pyrolysis unit to produce pyrolysis liquids. No separate mixing and devolatilization vessels are mentioned.

Price and Wilson (U.S. Pat. No. 5,821,395) disclose a process using an extruder or stirred tank pretreatment to remove chlorine from a waste plastic mixture that is pyrolyzed in a non-catalytic fluidized bed of solids to product liquids. Javeed et al (U.S. Pat. No. 10,829,696) describe a process of feeding a hydrocarbon stream, a first zeolitic catalyst, and a stripping gas to a devolatilization extruder to produce a liquid stream for upgrading in a pyrolytic or catalytic cracker. DeWhitt (U.S. Pat. No. 7,758,729) discloses a discontinuous (batch) process for "heating a plastic material in a treatment chamber in incremental steps through a series of graduated temperature set points . . . and pulling a vacuum of inert gas on the treatment chamber . . . to selectively remove an individual by-product corresponding to the temperature set point." Maezawa et al. in U.S. Pat. No. 5,608,136 describe a two-step pyrolytic process in which a mechanically mixed plastic mixture is pyrolyzed at reduced pressure, the vapor products scrubbed with a basic water wash, cooled, and the condensed products catalytically pyrolyzed under elevated pressure to produce product liquids. In U.S. Pat. No. 6,011,187, Horizoe et al. disclose a process for dechlorinating a mechanically agitated waste plastic mixture by heating it with hot sand in a horizontal screw-type reactor to produce a reduced chlorine material that can be pyrolyzed to form liquids. None of these publications include a static mixer to increase mixing and enhance chlorine removal.

Chlorine removal from plastics is a two-step reaction, a relatively faster low temperature process followed by a slower process that occurs at higher temperature and requires long residence time. Extruders and screw-type reactors have large length to diameter ratios (L/D) limited by the attainable length of the screw so that the residence time within an extruder or screw mixer is limited. Since the second chlorine removal process is slow the extent of chlorine removal within an extruder is necessarily limited.

Prior art dechlorination processes often employ continuous stirred tank reactors (CSTRs) that require quite large volumes to achieve the residence time needed to remove sufficient chlorine to reduce chlorine content to acceptable levels. Moreover, since the mixing disperses freshly fed higher chorine concentration plastic with the dechlorinated material to form a homogeneous mixture in a CSTR, the chlorine removal is limited.

The present invention provides a three-step process that removes chlorine and other halogens from a mixed plastic waste stream by heating the mixture in an extruder to remove a first portion of chlorine as HCl, plug flow mixing at long residence time in a mixing vessel, and pyrolyzing the stream in one or more further devolatilization vessels to remove the remaining chlorine to low levels with minimal formation of organic chlorides. Similarly, when the mixed plastic feed contains more than one halogen, i.e., chlorine, bromine, iodine, or fluorine, or any combination of these, the disclosed three-step process removes a combination of the halogens.

SUMMARY OF THE INVENTION

This invention concerns a process for removing chlorine from mixed plastic waste streams in a multi-step thermochemical process to achieve acceptable low concentrations of chlorine in the liquid products. Plastics like PVC and PVDC contain very high chlorine contents (57 mass % and 73 mass % respectively) so that even small amounts of these materials in plastic waste produces a significant quantity of chlorine in the mixture. Thermal treatment of plastic mixtures containing chlorine releases HCl but also produces chlorine-containing hydrocarbon liquids that are detrimental to downstream processes. The typical limit on chlorine in chemical processing is about 10 ppm or less. The multi-step process of this invention includes a low temperature first step conducted in an extruder, a mixing step conducted in a reactor in which plug flow conditions are established, and a devolatilization step in a pyrolysis reactor.

In one aspect, the invention provides a process for removing chlorine from a mixture of plastics comprising: (a) feeding a mixture of plastics with chlorine content of at least 100 ppm by weight to an extruder; (b) heating the mixture in the extruder releasing from the molten mixture a gas comprising HCl that exits through at least one degassing port; (c) passing the extruded plastic mixture from b) into a first plug flow hot mixing vessel; (d) passing the molten mixture from c) into a devolatilization vessel; and (e) recovering molten plastic with a reduced chlorine content from the devolatilization vessel.

GLOSSARY

Figure 1:
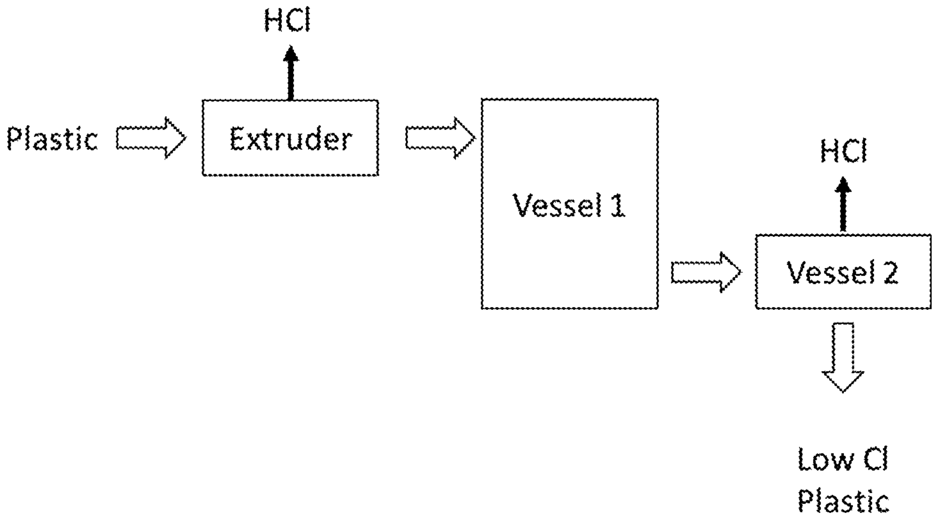
FIG. 1 shows a schematic of a process for removing chlorine from plastic mixtures.

Dechlorination—The term "dechlorination" means to remove chlorine or chlorine-containing compounds, such as, but not limited to HCl, chlorine-substituted aromatics or paraffins or olefins or some combination, from a plastic, or waste, or mixture of plastics, or some combination of these to produce a material that has a lower concentration of chlorine in it than does the feed material. Where HCl is indicated, the vapor mixture can comprise HCl or other halogen gases such as HF or HBr or HI, or some combination, although HCl is the most commonly occurring material since it is derived from PVC or PVDC which are both common plastic materials. Chlorine herein means atoms or ions or compounds of chlorine, not the gaseous elemental form of chlorine, $Cl_2$, unless specifically indicated. Where chlorine is indicated it is understood that the process can be similarly applied to any mixture containing the halogens chlorine, bromine, iodine, or fluorine, or any combination of these, and that these processes are envisioned within the scope of this disclosure.

Devolatilization—The term "devolatilization" means to remove volatile materials from a material, usually by heating or by exposure to a vacuum or both. Devolatilization is also a process where volatile materials are removed directly from an extruder during the melt extrusion of a polymer. A "devolatilization vessel" is apparatus in which, during operation, a separate vapor phase forms above the molten liquid phase to allow for vapor removal.

Fluid—The term "fluid" refers to a gas, a liquid, a mixture of a gas and a liquid, or a gas or a liquid containing dispersed solids, liquid droplets and/or gaseous bubbles. The terms "gas" and "vapor" have the same meaning and are sometimes used interchangeably.

Plastics or Polymers—The terms "plastics" and "polymers" are used interchangeably herein. A polymer is a carbon-based (at least 50 mass % C) material chiefly made up of repeating units and having a number average molecular weight of at least 100, typically greater than 1000 or greater than 10,000. Polymers include thermoplastic polymers such as, for example, polyethylene, polypropylene, polyesters, polyethylene terephthalate (PET), acrylonitrile-butadiene-styrene (ABS) copolymers, polyamide, polyurethane, polyethers, polycarbonates, poly(oxides), poly(sulfides), polyarylates, polyetherketones, polyetherimides, polysulfones, polyurethanes, polyvinyl alcohols, and polymers produced by polymerization of monomers, such as, for example, dienes, olefins, styrenes, acrylates, acrylonitrile, methacrylates, methacrylonitrile, diacids and diols, lactones, diacids and diamines, lactams, vinyl halides, vinyl esters, block copolymers thereof, and alloys thereof, thermoset polymers such as, for example, epoxy resins; phenolic resins; melamine resins; alkyd resins; vinyl ester resins; unsaturated polyester resins; crosslinked polyurethanes; polyisocyanurates; crosslinked elastomers, including but not limited to, polyisoprene, polybutadiene, styrene-butadiene, styrene-isoprene, ethylene-propylene-diene monomer polymer; and blends thereof. Mixtures of polymers separated from municipal solid waste or other waste streams are suitable feeds provided they contain only small fractions of contaminants such as S, N, O, or halogens. Polymers yielding halogenated material upon pyrolysis, for example, polyvinyl chloride (PVC), polyvinyldichloride (PVDC), polytetrafluoroethylene (PTFE), and other halogenated polymers, are included, but are often minimized in the feed materials to plastics upgrading processes.

Pyrolysis—The terms "pyrolysis" and "pyrolyzing" are given their conventional meaning in the art and are used to refer to the transformation of a compound, e.g., a solid hydrocarbonaceous material, into one or more other substances, e.g., volatile organic compounds, gases and coke, by heat, preferably without the addition of, or in the absence of, $O_2$. Preferably, the volume fraction of $O_2$ present in a pyrolysis reaction chamber is 0.5% or less. Pyrolysis may take place with or without the use of a catalyst.

The term “recovering” has the conventional meaning in process chemistry and can be replaced by the term “obtaining”.

Residence Time—The ‘residence time’ means the actual time under reaction conditions that a material spends in the active portion of the reactor, either the heated (or cooled) portion or in the volume of the reactor containing catalyst. In some embodiments, it may be advantageous to control the residence time of the fluidization fluid or liquid or molten materials in a vessel. The residence time of a material in a vessel is defined as the volume of the vessel divided by the volumetric flow rate of the material under process conditions of temperature and pressure. As is standard patent terminology, the term “comprising” means “including” and does not exclude additional components. Any of the inventive aspects described in conjunction with the term “comprising” also include narrower embodiments in which the term “comprising” is replaced by the narrower terms “consisting essentially of” or “consisting of” As used in this specification, the terms “includes” or “including” should not be read as limiting the invention but, rather, listing exemplary components.

DETAILED DESCRIPTION OF THE INVENTION

FIG. 1 presents a schematic of an embodiment of this invention that includes an extruder fitted with gas evolution port(s) to allow evolved HCl or other gases to be removed from the plastic mixture, a mixing vessel (vessel 1) that provides a long residence time for mixing and HCl evolution, and one or more devolatilization vessels (vessel 2) held at higher temperatures to remove further chlorine from the system, producing a low chlorine content molten liquid product mixture. The extruder, mixer, and the one or more devolatilization vessels are in fluid communication such that a molten or liquid phase can pass from the extruder into the one or more devolatilization vessels.

The plastic feed materials suitable for use in the invention can comprise all types of polymeric materials including polyethylene (PE), polypropylene (PP), polyacetylene, polybutylene, polyolefins, polyethylene terephthalate (PET), polybutylene terephthalate, polyester, copolyesters, polycarbonate, polyurethanes, polyamides, polystyrene (PS), polyacetal, epoxies, polycyanurates, polyacrylics, polyurea, vinyl esters, polyacrylonitrile, polyamide, polyurethane, polyethers, polycarbonates, poly(oxides), poly(sulfides), polyarylates, polyetherketones, polyetherimides, poly sulfones, polyurethanes, polyvinyl alcohol, polyvinylchloride (PVC), polyvinyl dichloride (PVDC), polyvinyl acetate, nylon, copolymers such as ethylene-propylene, acrylonitrile-butadiene-styrene (ABS), nitrile rubber, natural and synthetic rubber, tires, styrene-butadiene, styrene-acrylonitrile, styrene-isoprene, styrene-maleic anhydride, ethylene-vinyl acetate, nylon 12/6/66, filled polymers, polymer composites, plastic alloys, other polymeric materials, and polymers or plastics dissolved in a solvent, whether obtained from polymer or plastic manufacturing processes as waste or discarded materials, post-consumer recycled polymer materials, materials separated from waste streams such as municipal solid waste, and polymers produced by polymerization of monomers, such as, for example, dienes, olefins, styrenes, acrylates, acrylonitrile, methacrylates, methacrylonitrile, diacids and diols, lactones, diacids and diamines, lactams, vinyl esters, block copolymers thereof, and alloys thereof; thermoset polymers such as, for example, epoxy resins; phenolic resins; melamine resins; alkyd resins; vinyl ester resins; unsaturated polyester resins; crosslinked polyurethanes; polyisocyanurates; crosslinked elastomers, including but not limited to, polyisoprene, polybutadiene, styrene-butadiene, styrene-isoprene, or some combination of these. The invention includes subcombinations of these materials, as desired, or as available from a particular location; the invention can be described as comprising one or any combination of these materials.

The plastic feed in FIG. 1 comprises waste plastic that optionally has been pre-treated to make it suitable to be fed into an extruder. A mixture of plastics may be introduced into an optional feed system (not shown) that prepares the plastic mixture for introduction into the process by, for example, removing undesirable feed materials such as metal, minerals, halogenated materials, and the like, sizing the material to the desired size range, washing the material to remove contaminants, or some combination of these. The steps of removal of undesirable feed materials and sizing can be conducted in any order, i.e., either step can be conducted first and the other step conducted second. The removal of undesirable materials can include either manual picking of materials or automated separation of undesirable materials, or both. In some instances, the separation step may include mechanical separation, sink/float separation, air elutriation, or other known separation processes, preferably in an automated mode. In some instances, the particle size of the solid polymer feed composition may be reduced in a size reduction system prior to passing the feed to the extruder. In some embodiments, the average diameter of the reduced size feed composition exiting the size reduction system may comprise no more than about 50%, not more than about 25%, no more than about 10%, no more than about 5%, no more than about 2% of the mass average diameter of the feed composition fed to the size reduction system. The feed mixture may comprise plastics mixtures in which at least 85% by mass, at least 90% by mass, or at least 95% by mass of the particles pass through a 0.25 inch (0.6 cm), 0.5 inch (1.2 cm), 1.0 inch (2.5 cm), 1.5 inch (3.7 cm), 2 inch (5.0 cm), or 4 inch (10.0 cm) screen. Average diameter (size) can be measured by sieving through a mesh (screen) or series of meshes. Large-particle feed material may be more easily transportable and less difficult to process than small-particle feed material. On the other hand, in some cases it may be advantageous to feed small particles to the process. The use of a size reduction system allows for the transport of large-particle feed between the source and the process, while enabling the feed of small particles to the process.

The plastic mixture from which undesirable materials have been removed is passed to an optional washing process wherein the plastic mixture may be washed for example by treatment with a wash solution to remove unwanted materials such as dirt, labels, coatings, or the like, to produce a washed plastic mixture and used wash solution. Optionally the mixture of plastics may be heated sufficiently to melt the material producing a molten mixture of plastics that can optionally be passed through a screen or other filtering device to remove entrained solids. The plastic mixture is fed into the extruder either as a collection of small particles or as a molten mass or some combination of these depending on the pretreatment. The extruder is fitted with an entry port into which the plastic mixture is introduced and an exit port from which molten plastics are passed to later processes. The extruder is optionally fitted with one or more vapor exit ports such that vapors that are entrained in or produced in the extruder can escape the system and be processed separately from the molten plastic mixture. In the extruder the mixture is compressed and heated to a temperature sufficient to decompose the plastics into a product mixture comprising lighter components including HCl that are in a vapor phase and heavier components that are in a molten liquid phase, or a combination of solid and liquid phases. The extruder may optionally be fitted with a gas inlet port into which a gas is introduced that exits with the evolved vapors through the one or more gas exit ports. At least a portion of the vapor phase passes out of the vapor exit ports for further processing. The molten liquid phase is compressed and forced through the exit port of the extruder into a mixing vessel. The molten mixture may be passed into the mixing vessel via a melt pump.

In the mixing vessel the plastic mixture is heated to a temperature at least as high as the temperature at which it exited the extruder to further decompose the plastics and further evolve HCl. The molten plastic enters the mixing vessel at or near the top of the vessel with respect to gravity and exits the mixing vessel at or near the bottom of the mixing vessel. The plastic mixture is impelled through the mixing vessel by the action of the extruder, or it can be impelled by a melt pump. The flow of materials through the mixing vessel approximates plug flow, i.e. there is little back-mixing. The residence time of the material in the mixing vessel is at least 2, 5, 10, 20, 30, 40, 50, 60, or 70, or from 2 to 150, from 2 to 10, from 10 to 120, from 20 to 90, or from 40 to 80 minutes. Optionally, the mixing vessel may include a gas vent to allow any HCl or other light gases produced in the vessel to separate and exit from the vessel.

The residence time of the material in the devolatilization vessel(s) is at least 2, 5, 10, 20, 30, 40, 50, 60, or 70, or from 2 to 150, from 2 to 10, from 10 to 120, from 20 to 90, or from 40 to 80 minutes. The residence time of the molten plastic in the devolatilization vessel or vessels is sufficient to evolve enough HCl from the plastic mixture and the temperature is low enough so that few organic chlorides are formed such that the resulting Cl concentration in the remaining molten mixture is less than 10%, 5%, 1%, 0.5%, 0.1%, 0.05%, 0.01%, 0.005%, or 0.001%, or between 0.0001% and 1% of the Cl concentration of the feed mixture introduced into the extruder. The molten dechlorinated plastic mixture exiting the devolatilization vessel or vessels may comprise less than 500, less than 200, less than 100, less than 50, less than 20, less than 10, or less than 5, less than 2, or less than 1, or from 0.01 to 100, from 0.02 to 50, from 0.05 to 20, from 0.1 to 10, or from 0.1 to 5 ppm of chlorine by weight. The devolatilization vessel or vessels include a gas vent or vents to allow any HCl or other light gases produced in the devolatilization to separate and exit from the vessel.

Optionally, the molten plastic mixture that exits a first devolatilization vessel is passed into a second devolatilization vessel in which further Cl-containing material may be evolved. The second devolatilization vessel may be of the same or different type as the first devolatilization vessel. Removal of the evolved vapors from the plastic melt may be accomplished by a vent at or near the top of the first or second devolatilization vessel or both through which evolved gases including HCl may escape. The dechlorinated molten plastic mixture recovered from the last devolatilization vessel may comprise less than 500, less than 200, less than 100, less than 50, less than 20, less than 10, less than 5, less than 2, or less than 1, or from 0.01 to 100, from 0.02 to 50, from 0.05 to 20, from 0.1 to 10, or from 0.1 to 5 ppm of chlorine by weight.

Figure 2:
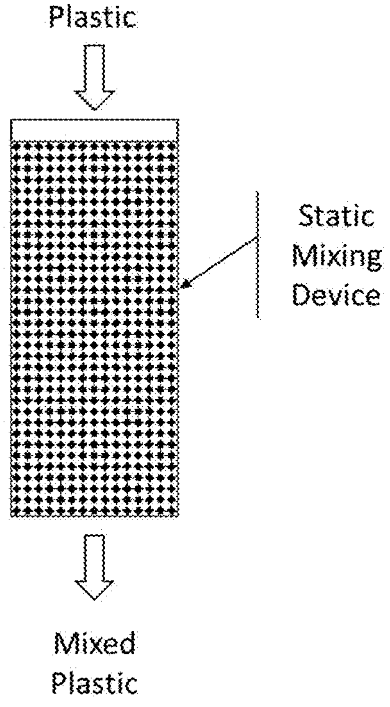
FIG. 2 shows a schematic of a column for mixing and/or devolatilization of plastic mixtures.

An example of a static mixing vessel is shown schematically in FIG. 2. In FIG. 2 the vessel is a cylindrical vessel fitted with internal fixed (non-moving) structures that mix the material as it flows down through the vessel. The fixed structures can be baffles, or spheres with or without passages within them, or shaped articles like berl saddles, packing rings, Raschig rings, sponges comprising numerous pores, screens, nets, or any other shaped structure or mixture of different structures that enhances mixing of the fluids. Preferably, the fixed structures within the mixing vessel are structures that offer minimal resistance to plug flow of the molten mixed plastic mixture while still providing good mixing such as open nets, screens, baffles, or the like. The fixed structures can be metallic or ceramic or some combination thereof. Plug flow is established within the mixing vessel so that back-mixing is minimized. The residence time within the mixing vessel is long so that HCl is evolved. The evolved gases may not condense to form a separate phase but be entrained in the molten plastic and passed to the devolatilization vessel or vessels.

The mixing vessel or any of the devolatilization vessels may optionally include an entry port for the introduction of gas at or near the bottom of the vessel and a gas exit port situated at or near the top of the vessel. Sweep gas may be introduced into the vessel to carry away the evolved vapors including HCl so that the HCl has less opportunity to react with organic species to form chlorine-containing hydrocarbonaceous species.

Static mixers provide many advantages compared to agitated mixing such as in CSTRs. An agitated mixer requires a significant amount of energy to move the agitating blades or other devices through the high viscosity plastic melt. The static mixer requires much less energy than a CSTR. A CSTR also introduces a significant amount of back-mixing; indeed, the 'ideal' CSTR is 'perfectly mixed' so that it has a constant concentration of materials within it. Thus, the fresh feed that contains a high concentration of Cl bonded to the polymer is dispersed throughout the mixture, maintaining a constant Cl content that is bonded to the polymer. By contrast, a static mixer that has plug flow establishes a bonded Cl concentration gradient from entrance to exit due to the decomposition of the materials that releases HCl so that there is less Cl bonded to the polymers in the mixture and more of the 'free' HCl. Thus, the mixture at the exit contains much less Cl bonded to the plastic and the remainder of the Cl is present as HCl vapor entrained in the mix that can be readily released in the devolatilization vessel.

Figure 3:
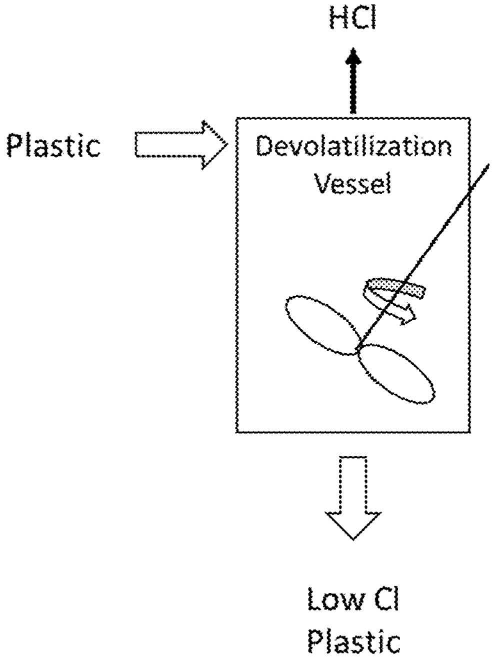
FIG. 3 depicts an embodiment of a mechanically mixed devolatilization vessel useful in the process.

One embodiment of a devolatilization vessel useful in the process is shown schematically in FIG. 3. In this embodiment, the devolatilization vessel includes paddles to promote the condensation of the entrained gases to form a separate vapor phase above the molten liquid phase and allow for HCl removal. The mixed molten plastic enters at or near the top of the devolatilization vessel and exits at or near the bottom of the vessel.

The devolatilization vessel can overcome the problem of high viscosity of the plastic mixture by being operated at higher temperatures than the mixing vessel so that the plastic mixture has a significantly reduced viscosity.

The extruder of the present invention includes an inlet port and an exit port wherein the temperatures can optionally be from 20° C. to 200° C., such as 20° C. to 100° C., or 20° C. to 50° C., at or near the inlet port, and the range of temperatures at the high temperature exit port can be from 200° C. to 400° C., such as from 225° C. to 350° C., or from 250° C. to 300° C. Within the extruder, the feed mixture is preferably heated to a temperature of at least 200° C. but no more than 400° C. The extruder can comprise a 1-screw extruder, two screw extruder, auger reactor, or similar device. Preferably, a gas chosen from among air, nitrogen, $CO_2$, steam, helium, argon, or some combination thereof is fed to the extruder. Optionally, the extruder comprises multiple zones separated such that vapor phases are prohibited from passing from an earlier zone into a later zone and each zone is fitted with one or more gas exit ports. The residence time of the feed mixture within the extruder is preferably at least 1, 2, 4, 10, 20, or 30 minutes, or from 1 to 60, or from 2 to 30 minutes. Optionally, the pressure in the extruder is at least 0.1 Mpa (1 bar), at least 0.3 Mpa (3 bar), at least 0.4 Mpa (4 bar), from 0.1 to 2.0 Mpa (1 to 20 bar), from 0.1 to 1.0 Mpa (1 to 10 bar), or from 0.3 to 0.8 Mpa (3 to 8 bar), preferably from 0.4 to 0.6 Mpa (4 to 6 bar). Preferably, the pressure in the extruder is greater than the pressure in any mixing or devolatilization vessel or vessels.

Preferably, the extruder is in fluid communication with a mixing vessel and one or more devolatilization vessels and the molten plastic mixture that exits the extruder enters the mixing vessel at or near the top of the vessel. The temperature of the plastic mixture within the mixing vessel can optionally be raised to at least 200° C., 225° C., or 250° C., or from 150° C. to 350° C., or from 200° C. to 300° C. Preferably, a gas comprising a material chosen from among air, nitrogen, $CO_2$, steam, helium, argon, or some combination thereof is fed at or near the bottom of the mixing vessel or devolatilization vessel and the vapors are exhausted at or near the top of the vessel.

The molten plastic mixture exits the mixing vessel and is preferably passed to one or more devolatilization vessels. The devolatilization vessel may comprise two or more devolatilization vessels in series. Optionally, the molten plastic mixture passes downward through the mixing vessel or any of the devolatilization vessels, or some combination thereof. In some embodiments, the mixing or devolatilization or both mixing and devolatilization vessels comprise a cylindrical vessel or vessels. Where the mixing vessel is a cylinder, the vessel preferably comprises packing material, such packing material comprising fixed structures such as baffles or mixing elements such as spheres with or without passages within them, or shaped articles like berl saddles, or packing rings, or Raschig rings, or sponges comprising numerous pores, nets, or screens, or any other shaped structure or mixture of different structures. Optionally, at least one devolatilization vessel is a continuously stirred tank reactor. The average residence time of condensed phases in the mixing vessel, or in any devolatilization vessel or the sum of these vessels, is at least 2, 5, 10, 20, 30, 40, 50, or 60 minutes, or from 2 to 150, from 10 to 120, from 20 to 90, or from 40 to 80 minutes. Optionally, at least a portion of the non-vapor products of the devolatilization vessel, or a portion of the gases remaining after the removal of desired products, or both, are combusted to provide energy for the pyrolysis process. Optionally, a solid co-reactant material is fed to at least one devolatilization vessel; the co-reactant may, for example, comprise one or more materials chosen from among agricultural lime, calcium oxide, calcium hydroxide, magnesium oxide, magnesium hydroxide, limestone, or hydrotalcites, or some combination thereof. Solid materials can be separated by filtration from the liquid phase of the devolatilization vessel. The hot vapor products produced in the mixing or any devolatilization vessel or vessels or both can be exhausted. Optionally, the hot vapor products produced in the mixing or any devolatilization vessel or vessels or both are passed through a solid or solution to remove or recover HCl. Optionally, the pressure in the mixing or any devolatilization vessel or both is at least 0.01 Mpa (0.1 bar), at least 0.03 Mpa (0.3 bar), or at least 0.05 Mpa (0.5 bar), or from 0.01 to 1.0 Mpa (0.1 to 10 bar), from 0.01 to 0.5 Mpa (0.1 to 5 bar), or from 0.05 Mpa to 0.2 Mpa (0.5 to 2 bar), preferably from 0.05 to 0.15 Mpa (0.5 to 1.5 bar). Preferably, the pressure in the mixing vessel is greater than the pressure in the devolatilization vessel or vessels.

Optionally, a melt flow pump can be used to facilitate the flow out of the extruder or out of the mixing or one or more devolatilization vessels. The melt flow pump can be configured with an extrusion die and cutter system to produce a nominal 2, 3, or 4, or from 1 to 5 or from 2 to 4 mm diameter pellet and the length/diameter ratio of pellets is no more than 2, no more than 1.7, no more than 1.5, or no more than 1.2, or from 1 to 2, or from 1.2 to 1.7. The control system may be configured to allow for the initial residence time of plastic in the devolatilization vessel to be achieved before starting the melt flow pump and pelletizing system.

Optionally, the molten plastic mix exiting the mixing vessel is introduced into the devolatilization vessel as a spray of droplets above the level of the plastic in the devolatilization vessel. Optionally, the droplet size is no more than 20 mm, or 15 mm, or 10 mm, or 5 mm, or 2 mm, or no more than 1 mm in average diameter. Preferably, the droplets are formed by passing the molten plastic mixture through a nozzle with numerous exit ports at a high flow rate under pressure. A stream of lower average molecular weight materials can be added to the molten plastic mixture entering the mixing vessel to facilitate mixing within the mixing vessel and droplet formation at the entrance to the devolatilization vessel; optionally, the lower molecular weight material is a recycle stream from the process wherein the average molecular weight is no more than 1000, 800, 500, 200, or 150 g/mole. Optionally, at least 50, or 70, or 80, or 90 wt % of the lower molecular weight material added to the mixture of plastics entering the mixing vessel has a boiling range from 350 to 500° C., 375 to 475° C., or 400 to 450° C.

Vapors exiting the extruder, mixing vessel, or devolatilization vessel(s) or some combination of these, can be passed through a solid or solution that reacts with HCl to trap the chlorine in the solid or solution. Optionally, the vapors from which HCl has been substantially removed can be added to the molten plastic mixture for further upgrading during the plastics upgrading process.

The inventive method may be further characterized by one or any combination of the following features:

Feed feeding a feed mixture comprising plastics containing at least 100 ppm chlorine by weight to an extruder;

wherein the feed mixture comprises plastics chosen from among polyethylene, polypropylene, polyesters, polyethylene terephthalate (PET), polyvinylchloride (PVC), polyvinyldichloride (PVDC), poly (1,1,2,2 tetrafluoroethylene) (PTFE), fluorinated polymer, acrylonitrile-butadiene-styrene (ABS) copolymers, polyamide, polyurethane, polyethers, polycarbonates, poly (oxides), poly(sulfides), polyarylates, polyetherketones, polyetherimides, polysulfones, polyurethanes, polyvinyl alcohols, and polymers produced by polymerization of monomers, such as, for example, dienes, olefins, styrenes, acrylates, acrylonitrile, methacrylates, methacrylonitrile, diacids and diols, lactones, diacids and diamines, lactams, vinyl esters, block copolymers thereof, and alloys thereof; thermoset polymers such as, for example, epoxy resins; phenolic resins; melamine resins; alkyd resins; vinyl ester resins; unsaturated polyester resins; crosslinked polyurethanes; polyisocyanurates; crosslinked elastomers, including but not limited to, polyisoprene, polybutadiene, styrene-butadiene, styrene-isoprene, ethylene-propylene-diene monomer polymer; and mixtures thereof;

wherein the feed mixture may comprise a mix of waste plastic chosen from among polyethylene terephthalate (PET), high density polyethylene (HDPE), polyvinyl chloride (PVC), polyvinylidene (PVCD), low density polyethylene (LDPE), polypropylene (PP), polystyrene (PS), or mixed resins, or a combination thereof;

wherein the feed stream of plastics is first heated to achieve a molten state and filtered to remove solids;

wherein the feed stream comprises polymers that contain bromine or glass fibers, or a combination thereof;

wherein the feed stream comprises biomass, or wood waste, or food waste, or organic components of municipal solid waste, or agricultural waste, or a combination thereof;

Extruder wherein the extruder comprises an inlet port and an exit port;

wherein the temperatures can be from 20° C. to 250° C., such as 20 to 100° C., or 20 to 50° C., at or near the inlet port, and the range of temperatures at the high temperature exit port can be from 200° C. to 400° C., such as from 225 to 350° C., or from 250 to 300° C.;

wherein the feed mixture is heated to a temperature of at least 200 but no more than 400° C. to at least partially decompose the polymers in an extruder;

wherein the residence time of the feed mixture within the extruder is at least 1, 2, 4, 10, 20, or 30 minutes, or from 1 to 60, or from 2 to 30 minutes;

wherein the extruder is fitted with one or more gas exit ports through which evolved HCl can be removed;

wherein HCl can be removed from the extruder through one or more gas exit ports;

wherein a gas can be fed to the extruder;

wherein an added gas chosen from among air, nitrogen, $CO_2$, steam, helium, or argon, or some combination thereof can be fed to the extruder;

wherein HCl and any added gas can exit the extruder through one or more gas exit ports;

wherein the extruder comprises a 1-screw extruder, two screw extruder, auger reactor, rotating kiln reactor, or a stepped grate reactor, or some combination thereof;

wherein the extruder comprises multiple zones separated such that vapor phases are prohibited from passing from an earlier zone into a later zone and at least one zone is fitted with one or more gas exit ports;

wherein the extruder comprises a compounding port;

wherein the extruder comprises multiple extruders run in parallel;

wherein the one or more extruder exit ports are operated under vacuum;

Mixing Vessels wherein the extruder is in fluid communication with one or more mixing or devolatilization vessels;

wherein the molten plastic mixture exits the extruder and enters a mixing vessel at or near the top of the vessel;

wherein the mixing vessel is a plug flow vessel;

wherein the temperature of the plastic mixture within the mixing vessel is raised to at least 250, 275, 300, 325, or 350° C.;

wherein an added gas chosen from among air, nitrogen, $CO_2$, steam, helium, argon, or some combination thereof is fed at or near the bottom of the mixing vessel or devolatilization vessel, and the vapors are exhausted;

wherein the molten plastic mixture that exits the mixing vessel can be passed to one or more devolatilization vessels;

wherein the devolatilization vessel comprises two or more devolatilization vessels in series;

wherein the molten plastic mixture may pass downward through the mixing vessel or first or second devolatilization vessels or any combination thereof;

wherein the mixing or devolatilization or both vessels comprise a cylindrical vessel;

wherein the mixing or devolatilization vessel(s) or both comprise packing material;

wherein the mixing or devolatilization vessel(s) or both comprise baffles or mixing elements;

wherein the mixing elements in the mixing vessel comprise fixed structures such as spheres with or without passages within them, or shaped articles like berl saddles, packing rings, Raschig rings, sponges comprising numerous pores, nets, screens, or any other shaped structure, or some combination of different structures;

wherein the average residence time of condensed phases in the mixing vessel is at least 2, 5, 10, 20, 30, 40, 50, or 60, or from 2 to 150, from 2 to 10, from 10 to 120, from 20 to 90, or from 40 to 80 minutes;

wherein the average residence time of condensed phases in the mixing vessel, or in any devolatilization vessel (s), or in the mixing vessel and any devolatilization vessels, is at least 2, 5, 10, 20, 30, 40, 50, or 60, or from 2 to 150, from 2 to 10, from 10 to 120, from 20 to 90, or from 40 to 80 minutes;

wherein the temperature of the plastic mixture is raised to at least 200° C., 225° C., or 250° C., or from 150° C. to 350° C., from 200° C. to 300° C., or from 250° C. to 300° C. in the mixing vessel and the condensed phases are passed to a devolatilization vessel;

wherein at least a portion of the non-vapor products of the devolatilization vessel, or a portion of the gases remaining after removal of desired products, or both, are combusted to provide energy for heating one or more of the extruder, the mixer, and devolatilization vessels;

wherein at least a portion of the condensed phases that exit the mixing vessel is separated into solid and liquid fractions and at least a portion of the solids, or a portion of the liquids, or both, is recycled to the extruder;

wherein a solid co-reactant material is fed to the mixing or any devolatilization vessels;

wherein the solid co-reactant fed to the mixing vessel or any devolatilization vessels comprises one or more materials chosen from among agricultural lime, calcium oxide, calcium hydroxide, magnesium oxide, magnesium hydroxide, limestone, or hydrotalcites, or some combination thereof;

wherein solid material is separated by filtration from the liquid phase of the mixing or any devolatilization vessels;

wherein the hot vapor products produced in the mixing or any devolatilization vessel or both are exhausted;

wherein the hot vapor products produced in the mixing vessel or devolatilization vessel(s) or both are passed through a solid or solution to remove HCl;

wherein plug flow of the plastic mixture is established in the mixing or any devolatilization vessel;

wherein the molten plastic mixture is passed from the extruder to the mixing vessel via a melt pump;

wherein the molten plastic mixture is passed from the mixing vessel to the devolatilization vessel via a melt pump;

wherein the pressure in the extruder is at least 0.1 MPa (1 bar), at least 0.3 Mpa (3 bar), or at least 0.4 Mpa (4 bar), or from 0.1 to 2.0 Mpa (1 to 20 bar), from 0.1 to 1.0 Mpa (1 to 10 bar), or from 0.3 to 0.8 Mpa (3 to 8 bar), preferably from 0.4 to 0.6 Mpa (4 to 6 bar);

wherein the pressure in the mixing vessel or any devolatilization vessel or both is at least 0.01 Mpa (0.1 bar), at least 0.03 Mpa (0.3 bar), or at least 0.05 Mpa (0.5 bar), or from 0.01 to 1.0 Mpa (0.1 to 10 bar), from 0.01 to 0.5 Mpa (0.1 to 5 bar), or from 0.05 Mpa to 0.2 Mpa (0.5 to 2 bar), preferably from 0.05 to 0.15 Mpa (0.5 to 1.5 bar);

wherein the pressure in the extruder is greater than the pressure in the devolatilization vessel or vessels;

wherein the pressure in the mixing vessel is greater than the pressure in the devolatilization vessel or vessels;

wherein one or more of the devolatilization vessel or vessels is a continuously stirred tank reactor vessel (CSTR);

wherein one or more of the continually stirred tank vessel(s) include paddles or blades, or rotor/stator mixer, a multi-shaft mixer, or a double planetary mixer, or helical mixer, or more than one active mixer;

wherein the residence time of the plastic mixture in the mixing vessel is greater than the residence time in the devolatilization vessel or vessels;

wherein the temperature of the plastic mixture in the mixing vessel is no more than the temperature in the devolatilization vessel(s);

wherein at least a portion of the condensed phases that exit the devolatilization vessel is separated into solid and liquid fractions and at least a portion of the solids, or a portion of the liquids, or both, is recycled to the extruder or to the mixing vessel;

wherein the plastic mixture entering the devolatilization vessel is dispersed as droplets into a gas phase within the devolatilization vessel;

wherein the plastic mixture entering the devolatilization vessel is dispersed by passage through a spray nozzle;

wherein the molten plastic mix exiting the mixing vessel is introduced into the devolatilization vessel as a spray of droplets above the level of the plastic in the devolatilization vessel;

wherein the droplet size of the plastic dispersed into the devolatilization vessel is no more than 20 mm, 15 mm, 10 mm, 5 mm, 2 mm, 1 mm, 0.5 mm, or 0.2 mm in average diameter;

wherein the droplets are formed by passing the molten plastic mixture through a nozzle with numerous exit ports at a high flow rate under pressure;

wherein a stream of lower average molecular weight hydrocarbonaceous materials is added to the molten plastic mixture entering the mixing vessel to facilitate mixing within the mixing vessel and droplet formation at the entrance to the devolatilization vessel;

wherein the lower molecular weight material added to the plastic mixture is a recycle stream from the process wherein the average molecular weight is no more than 1000, 800, 500, 200, or 150 g/mole;

wherein at least 50, 70, 80, or 90 wt % of the lower molecular weight material added to the mixture of plastics entering the mixing vessel has a boiling range from 350 to 500° C., 375 to 475° C., or 400 to 450° C.;

wherein at least one devolatilization vessel is subjected to sonication to enhance vapor/liquid separation;

wherein the dechlorinated plastic mixture that exits the devolatilization vessel or vessels is sent to a plastics upgrading process;

wherein the plastics upgrading process is thermal cracking, or catalytic cracking, or hydrocracking, or some combination of these; wherein the dechlorinated plastic recovered from the first or second devolatilization vessel comprises less than 500, less than 200, less than 100, less than 50, less than 20, less than 10, less than 5, less than 2, or less than 1, or from 0.01 to 100, from 0.02 to 50, from 0.05 to 20, from 0.1 to 10, or from 0.1 to 5 ppm of chlorine by weight;

wherein the plastic mixture recovered from the last devolatilization vessel is passed via a melt flow pump through an extrusion die and cutter to produce pellets with a nominal diameter of 2, 3, or 4, or from 1 to 5, or from 2 to 4 mm, and the length/diameter ratio of the pellets is no more than 2, no more than 1.7, no more than 1.5, or no more than 1.2, or from 1 to 2, or from 1.2 to 1.7;

wherein the plastic mixture recovered from the last devolatilization vessel is passed to a thermal cracker, hydrocracker, catalytic cracker, or other thermal treatment unit or units in which the plastic is cracked to lower average molecular weight materials;

wherein the plastic mixture recovered from the last devolatilization vessel is mixed with a petroleum stream and passed to a thermal cracker, hydrocracker, catalytic cracker, or other thermal treatment unit or units in which the plastic is cracked to lower average molecular weight materials;

wherein materials recovered from the cracker, hydrocracker, catalytic cracker, or other thermal treatment vessel comprises olefins or aromatics or some combination thereof;

wherein materials recovered from the cracker, hydrocracker, catalytic cracker, or other thermal treatment vessel comprises naphtha or C1-C8 hydrocarbons or some combination thereof.

What is claimed:

1. A process for removing chlorine from a mixture of plastics comprising:

a) feeding a mixture of plastics with chlorine content of at least 100 ppm by weight to an extruder;

b) heating the mixture in the extruder releasing from a molten mixture a gas comprising HCl that exits through at least one degassing port;

c) passing the extruded plastic mixture from b) into a first plug flow hot mixing vessel;

passing the molten mixture from c) into a devolatilization vessel; and recovering molten plastic with a reduced chlorine content from the devolatilization vessel.

2. The process of claim 1 wherein the devolatilization vessel is a continuous stirred tank reactor (CSTR).

3. The process of claim 1 wherein a gas stream is passed through the molten mixture in the extruder and exits through the at least one degassing port.

4. The process of claim 1 wherein the plug flow hot mixing vessel is a column fitted with static mixing internals.

5. The process of claim 1 wherein the molten plastic from the extruder enters at the top of a column fitted with a device for dispersing the molten plastic.

6. The process of claim 5 wherein the device dispersing the molten plastic is a spray nozzle.

7. The process of claim 4 wherein the plastic mixture in the plug flow hot mixing vessel has a residence time of at least 30 minutes.

8. The process of claim 1 wherein the extruder has multiple degassing ports.

9. The process of claim 1 wherein the feed mixture comprises a mix of waste plastic chosen from among polyethylene terephthalate (PET), high density polyethylene (HDPE), polyvinyl chloride (PVC), polyvinylidene (PVCD), low density polyethylene (LDPE), polypropylene (PP), polystyrene (PS), or a combination thereof.

10. The process of claim 1 wherein the feed mixture is heated to a temperature of at least 200° C. but no more than 400° C. in the extruder to at least partially decompose the polymers in the extruder.

11. The process of claim 1 wherein the extruder is fitted with one or more gas exit ports through which evolved HCl is removed.

12. The process of claim 1 wherein a gas chosen from among air, nitrogen, $CO_2$, steam, helium, argon, or some combination thereof is fed to the extruder.

13. The process of claim 1 wherein the temperature of the plastic mixture within the plug flow hot mixing vessel is raised to at least 250, 275, 300, 325, or at least 350° C.

14. The process of claim 1 wherein gas chosen from among air, nitrogen, $CO_2$, steam, helium, argon, or a combination thereof is fed at the bottom of the mixing vessel, or devolatilization vessel, or both, and the vapors are exhausted.

15. The process of claim 1 wherein the molten plastic mixture passes downward through the mixing vessel or devolatilization vessel or both.

16. The process of claim 4 wherein the static mixing internals comprise spheres with or without passages through them, berl saddles, packing rings, Raschig rings, sponges, or screens or a combination of thereof.

17. The process of claim 1 wherein at least a portion of non-vapor products of the devolatilization vessel, or a portion of the gases remaining after removal of products, or both, are combusted to provide energy for heating one or more of the extruder, plug flow hot mixing vessel, or devolatilization vessels.

18. The process of claim 1 wherein a solid co-reactant material is fed to the devolatilization vessel; and wherein the solid co-reactant fed to the devolatilization vessel comprises one or more materials chosen from among agricultural lime, calcium oxide, calcium hydroxide, magnesium oxide, magnesium hydroxide, limestone, hydrotalcites, or a combination thereof.

19. The process of claim 1 wherein hot vapor products produced in the extruder, the mixing vessel, or a first or a second devolatilization vessel or any combination of these are passed through a solid or solution to remove HCl.

20. The process of claim 1 wherein the devolatilization vessel comprises a continually stirred tank vessel which comprises paddles or blades, or rotor/stator mixer, a multi-shaft mixer, or a double planetary mixer, or helical mixer, or more than one active mixer.

21. The process of claim 1 wherein the residence time of the plastic mixture in the first mixing vessel plug flow hot mixing vessel is greater than the residence time in the devolatilization vessel.

22. The process of claim 1 wherein the temperature of the plastic mixture in the first mixing vessel is less than the temperature in the devolatilization vessel.

23. The process of claim 1 wherein the feed stream comprises polymers that contain bromine or glass fibers, or some combination thereof.

24. The process of claim 1 wherein the feed stream also comprises biomass, or wood waste, or food waste, or organic components of municipal solid waste, or agricultural waste, or some combination thereof.

25. The process of claim 1 wherein the plastic mixture entering the devolatilization vessel is dispersed as droplets into a gas phase within the devolatilization vessel.

26. The process of claim 1 wherein a stream of hydrocarbonaceous materials is added to the molten plastic mixture entering the plug flow hot mixing vessel.

27. The process of claim 26 wherein the stream added to the plastic mixture is a recycle stream from the process wherein the mass average molecular weight of the stream is no more than 1000, 800, 500, 200, or 150 g/mole.

28. The process of claim 1 wherein at least one devolatilization vessel is subjected to sonication to enhance vapor/liquid separation.

29. The process of claim 1 wherein at least a portion of condensed phases that exit the plug flow hot mixing vessel is separated into solid and liquid fractions and at least a portion of the solids, or a portion of the liquids, or both, is recycled to the extruder.

* * * * *